United States Patent
Taylor et al.

(10) Patent No.: US 7,979,577 B2
(45) Date of Patent: *Jul. 12, 2011

(54) ARRANGEMENT IN A MULTI-HOMED TRANSPORT ENDPOINT FOR SELECTING A SOURCE ADDRESS BASED ON SOURCE-DESTINATION ADDRESS PAIR METRICS

(75) Inventors: Wayne Nicholas Taylor, Durham, NC (US); Uwe Sellentin, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 109 days.

This patent is subject to a terminal disclaimer.

(21) Appl. No.: 12/314,548

(22) Filed: Dec. 12, 2008

(65) Prior Publication Data
US 2009/0164650 A1 Jun. 25, 2009

Related U.S. Application Data

(63) Continuation of application No. 10/725,511, filed on Dec. 3, 2003, now Pat. No. 7,472,200.

(51) Int. Cl.
*G06F 15/16* (2006.01)
*G06F 15/173* (2006.01)
(52) U.S. Cl. .............. 709/238; 709/227; 709/228
(58) Field of Classification Search ........... 709/227, 709/228, 238
See application file for complete search history.

(56) References Cited

U.S. PATENT DOCUMENTS
7,068,598 B1   6/2006 Bryson et al.
7,277,954 B1 * 10/2007 Stewart et al. .......... 709/230
2003/0093485 A1 * 5/2003 Dougall et al. .......... 709/208

OTHER PUBLICATIONS

Stewart et aL., "Stream Control Transmission Protocol", Request for Comments 2960, Network Working Group, Oct. 2000, pp. 1-134.

* cited by examiner

*Primary Examiner* — Brian J Gillis
(74) *Attorney, Agent, or Firm* — Leon R. Turkevich

(57) ABSTRACT

A multi-homed endpoint, having multiple interfaces with respective source addresses, selects a source address for transport of a message according to a prescribed multi-homed transfer protocol, based on source-destination address pair metrics, each source-destination address pair metric identifying link performance between a corresponding source address and a corresponding destination address. Each source-destination address pair is assigned a counter for tracking respective acknowledgements to messages output via the corresponding source-destination address pair. The multi-homed endpoint selects a source-destination address pair, for transport of messages, based on the corresponding metric identifying the highest relative link performance. Heartbeat messages are periodically sent for unselected source-destination pairs to maintain updated link performance metrics between the respective source-destination address pairs. Hence, the multi-homed endpoint can ensure selection of a link having opimum link performance based on the corresponding counter specifying the highest relative link performance for the corresponding source-destination address pair.

14 Claims, 4 Drawing Sheets

US 7,979,577 B2

ARRANGEMENT IN A MULTI-HOMED TRANSPORT ENDPOINT FOR SELECTING A SOURCE ADDRESS BASED ON SOURCE-DESTINATION ADDRESS PAIR METRICS

This application is continuation of application Ser. No. 10/725,511, filed Dec. 3, 2003 now U.S. Pat. No. 7,472,200.

BACKGROUND OF THE INVENTION

1. Field of the Invention

The present invention relates to transport of Internet Protocol (IP) packets via a multi-homed transport such as Stream Control Transmission Protocol (SCTP). More particularly, the present invention relates to source address selection for multi-homed transport of packets between multi-homed peers.

2. Description of the Related Art

The worldwide deployment of Internet Protocol (IP) networks has resulted in the development of newer protocols that extend the capabilities of IP networks. For example, telecommunications services providers providing telephony and wireless PCS services have begun deploying IP-based telecommunications for transport of signaling messages (e.g., Signaling System 7 (SS7) protocol messages) as well as trunk (i.e., bearer channel) messages.

The Internet Engineering Task Force (IETF) Network Working Group has published a proposal for extending IP networks, considered connectionless networks, to support a reliable transport protocol, namely the Request for Comments (RFC) 2960 by Stewart et al., "Stream Control Transmission Protocol", October 2000, available on the World Wide Web at the address http://www.ietf.org/rfc/rfc2960.txt, the disclosure of which is incorporated in its entirety herein by reference. RFC 2960 is an example of a multi-homed transport protocol, where an SCTP endpoint can be considered multi-homed if there exists more than one transport address that can be used as a destination address to reach that SCTP endpoint.

SCTP protocol is similar to Transmission Control Protocol (TCP) as specified in RFC 793, in that SCTP provides security and flow control. One difference between SCTP and TCP is that SCTP is connection-oriented in nature (i.e., point-to-point), whereas TCP is byte-oriented in nature, where a sequence of bytes supplied at one endpoint are received at the destination endpoint in the same endpoint (i.e., without any reordering). SCTP, however, is not byte-oriented but rather is chunk-oriented: a "chunk" is a container for transporting data such as an SS7 signaling unit. The use of a "chunk" oriented protocol as opposed to byte-oriented TCP protocol provides flexibility in the "granularity" of data flows and acknowledgements.

In addition, TCP defines an endpoint based on a single IP address and a correspoding single port number; hence, if a TCP connection relies on an an IP address that encounters a failure on the network, the TCP connection is broken, requiring opening a new TCP connection using a different IP address or a different physical interface.

In contrast, SCTP defines an endpoint as having one unique port number and one or more IP addresses. Hence, SCTP provides "multi-homing", where multiple IP addresses are available for the same SCTP connection, also referred to as an "association". The assocation exists between two SCTP endpoints, where each endpoint has a unique port number and one or more available IP addresses. Hence, if an SCTP endpoint has an Ethernet interface that has a corresponding IP address and that encounters a failure, the SCTP protocol enables the SCTP endpoint to switch to a different IP address and begin transmission on the corresponding Ethernet interface, while maintaining the flow of packets.

FIG. 1 is a block diagram illustrating multi-homed endpoints 10 communicating via an IP network 12 using a multi-homed transport protocol, such as SCTP. Each endpoint 10a and 10b includes at least two interfaces 14: the endpoint 10a includes a primary interface 14a having IP address "1" and a secondary interface 14b having IP address "2", and the endpoint 10b includes a primary interface 14c having IP address "3" and a secondary interface 14d having IP address "4". As described above, each endpoint 10a and 10b is identified by one port number and two IP addresses, such that two IP addresses exist on each endpoint 10: as illustrated in FIG. 1, the endpoint 10a is identified by "Port 0" and its interfaces 14a and 14b are identified by respective IP addresses "1" and "2"; the endpoint 10b is identified by "Port 1" and its interfaces 14c and 14d are identified by respective IP addresses "3" and "4".

The RFC 2960 specifies that each endpoint 10a and 10b is able to provide the other endpoint (10b and 10a) during association startup with a list of transport addresses (each specifying SCTP port and IP addresses) through which the corresponding endpoint can be reached and from which it will originate SCTP packets. The existence of two IP addresses for each SCTP endpoint 10 results in four (4) possible source address/destination address pairs that can be used to send packets between the endpoints: 1-to-3, 1-to-4, 2-to-3, and 2-to-4. Hence, upper-layer messaging protocol layers (e.g, an SS7 application) executed by the endpoint 10a send a message to the SCTP port (Port 0), enabling the message to be output via either of the interfaces 14a or 14b.

The RFC 2960 does not specify the manner in which an IP address (e.g., "1" or "2") should be selected for a corresponding interface (e.g., 14a or 14b), but rather relies on underlying routing protocols for source address selection. Alternatively, multi-homed transport mechanisms may use static routing which does not provide any feedback about changes within the network path.

Hence, arbitrary implementations for source address selection may create numerous problems. For example, the source address selection may not be accurate due to stale information caused by the reconvergence times of the underlying routing protocol. In some instances, the source address selected by the routing protocol may not be an address utilized by the multi-homed transport. If static routing is used, source address selection is limited to the routing information that was statically provisioned: in most cases a sender lacks any information for selecting a source address, except possibly a measured round-trip-time (RTT) that is maintained on a per-destination basis.

SUMMARY OF THE INVENTION

There is a need for an arrangement that enables a multi-homed endpoint, having a plurality of available source addresses, to select an available source address for optimized communications. In particular, there is a need for an arrangement that enables a multi-homed endpoint to select an available source address based on monitored source-destination address pair metrics that specify respective performance attributes.

There also is a need for an arrangement that enables a multi-homed endpoint to select an available source address, based on monitored source-destination address pair metrics, in a manner that minimizes use of unreliable links.

These and other needs are attained by the present invention, where a multi-homed endpoint, having multiple interfaces with respective source addresses, selects a source address for transport of a message according to a prescribed multi-homed transfer protocol, based on source-destination address pair metrics, each source-destination address pair metric identifying link performance between a corresponding source addresses and a corresponding destination address. The multi-homed endpoint selects a source-destination address pair, for transport of messages, based on the corresponding metric identifying the highest relative link performance. Hence, the multi-homed endpoint can ensure selection of a link having optimum link performance.

One aspect of the present invention provides a method in a multi-homed endpoint having multiple interfaces with respective Internet Protocol (IP) source addresses. The method includes first identifying source-destination address pairs available between the IP source addresses of the multi-homed endpoint and IP destination addresses available for reaching a multi-homed peer via an IP network. The method also includes initiating, for each source-destination address pair, a metric for identifying successful data transfer between the corresponding IP source address of the multi-homed endpoint and the corresponding IP destination address of the multi-homed peer. The method also includes identifying one of the source-destination address pairs having the corresponding metric indicating a highest successful data transfer relative to the other source-destination pairs, and selecting the interface having the IP source address associated with the identified one source-destination address pair, for transport of a message to the multi-homed peer.

Another aspect of the present invention provides a multi-homed endpoint including a plurality of interfaces, having respective Internet Protocol (IP) source addresses, for connection with an IP network, a first executable resource, and a selection resource. The first executable resource is configured for identifying source-destination address pairs available between the IP source addresses and IP destination addresses available for reaching a multi-homed peer via the IP network. The first executable resource is configured for initiating, for each source-destination address pair, a metric for identifying successful data transfer between the corresponding IP source address of the multi-homed endpoint and the corresponding IP destination address of the multi-homed peer. The selection resource is configured for identifying one of the source-destination address pairs having the corresponding metric indicating a highest successful data transfer relative to the other source-destination pairs, the selection resource configured for selecting the interface having the IP source address associated with the identified one source-destination address pair, for transport of a message to the multi-homed peer.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
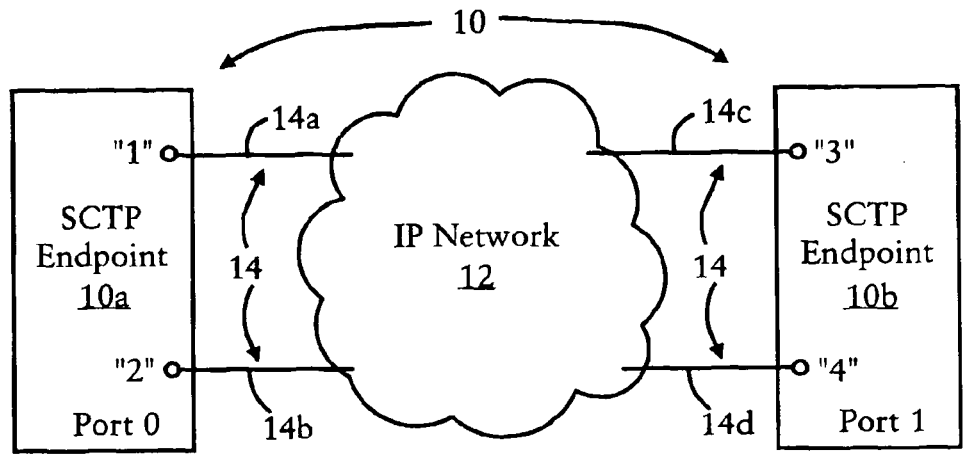
FIG. 1 is a diagram illustrating a prior known (PRIOR ART) architecture for multi-homed endpoints utilizing SCTP protocol.
Figure 2:
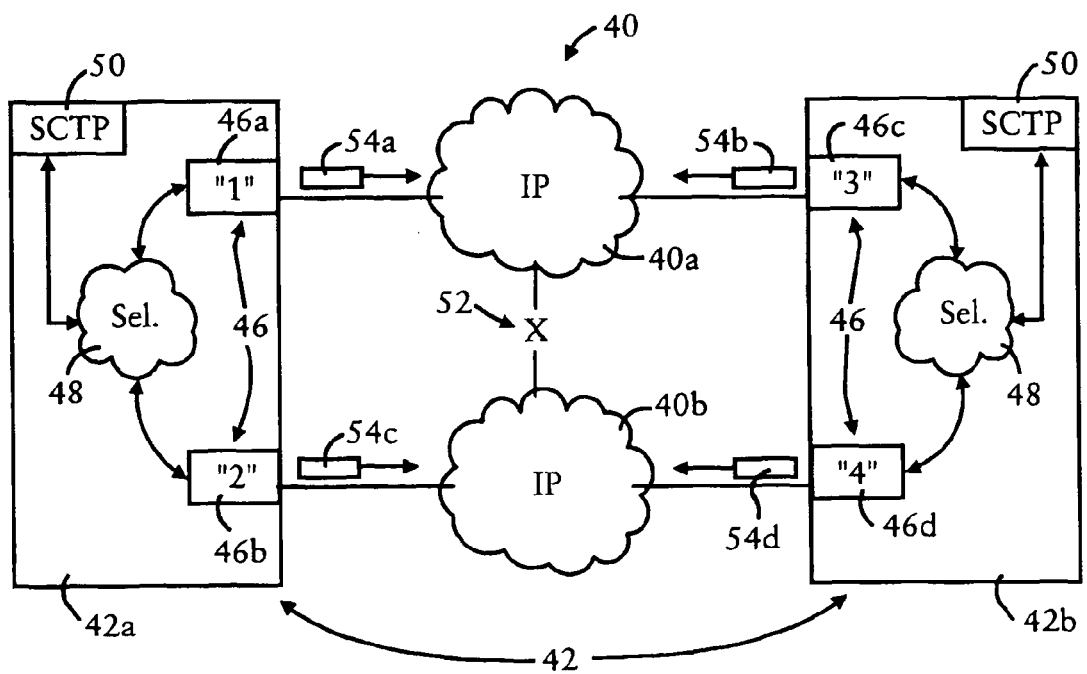
FIG. 2 is a diagram illustrating multi-homed endpoints configured for selecting source addresses based on detected source-destination address pair metrics, according to an embodiment of the present invention.

FIG. 2 is a block diagram illustrating a network 40 having multi-homed endpoints 42 configured for maintaining source-destination address pair metrics for selecting a source address for message transmission, according to an embodiment of the present invention. In particular, the multi-homed endpoints 42 each include at least two network interfaces 46, and source address selection logic modules 48 configured for selecting a network interface 46 based on its corresponding source IP address, for transfer of messages from the SCTP resources 50.

Each source address selection logic module 48 is configured for identifying an interface 46 having the highest relative link performance. In particular, the multi-homed endpoint 42a has network interfaces 46a and 46b having respective assigned IP addresses "1" and "2", and the multi-homed endpoint 42b has network interfaces 46c and 46d having respective assigned IP addresses "3" and "4". Also note in FIG. 2 that the IP network 40 is illustrated as being subdivided into a first network portion 40a and a second network portion 40b: this subdivision of separate network portions 40a and 40b in the network 40 may occur during deployment of the network 40, either intentionally through network design, or accidentally in the event of a link failure 52 between two routers interconnecting the network portions 40a and 40b.

As apparent from the foregoing, the endpoint 42a is able to send a message 54a from the network interface 46a (having source IP address "1") to the network interfaces 46c (having destination IP address "3") via the network portion 40a; the endpoint 42b is able to send an acknowledgment 54b to the message 54a based on switching the source-destination address values, thereby sending the acknowledgment 54b from the IP address "3" of the interface 46c to the IP address ("1") specified in the source address field of the message 54a, to the network interface 46a via the network portion 40a. In a similar manner, the endpoint 42a is able to send a message 54c from the network interface 46b (having source IP address "2") to the network interfaces 46d (having destination IP address "4") via the network portion 40b; the endpoint 42b is able to send an acknowledgment 54d to the message 54c based on switching the source-destination address values, thereby sending the acknowledgment 54d from the IP address "4" of the interface 46d to the IP address ("2") specified in the source address field of the message 54c, to the network interface 46b via the network portion 40b.

However, the segmentation of the network portions 40a and 40b (e.g., due to the link failure 52) normally would prevent the multi-homed endpoints 42 from identifying that the source-destination address pairs "1-4" and "2-3" (as identified by the endpoint 42a), or "3-2" and "4-1" (as identified by the endpoint 42b), are unusable. Even if a failover mechanisms is applied that enables the multi-homed endpoints 42 to select another source IP address in the event that a multi-homed endpoint 42 does not receive an acknowledgment within a prescribed time interval, concerns arise regarding the ability for selecting a source IP address, especially in the case where a failed link 52 may be later repaired. In particular, if a failed link 52 is later repaired, it would be desirable to place that link 52 back into service as soon as practicable, without manual reprovisioning.

According to the disclosed embodiment, the source address selection logic module 48 is configured for monitoring performance of the address pairs, in order to select a source address having the corresponding metric identifying the highest relative link performance. In addition, the continuous monitoring of performance on source-destination address pair basis enables the multi-homed endpoint 42 to select the optimum source address, on a per-packet basis.

Figure 3:
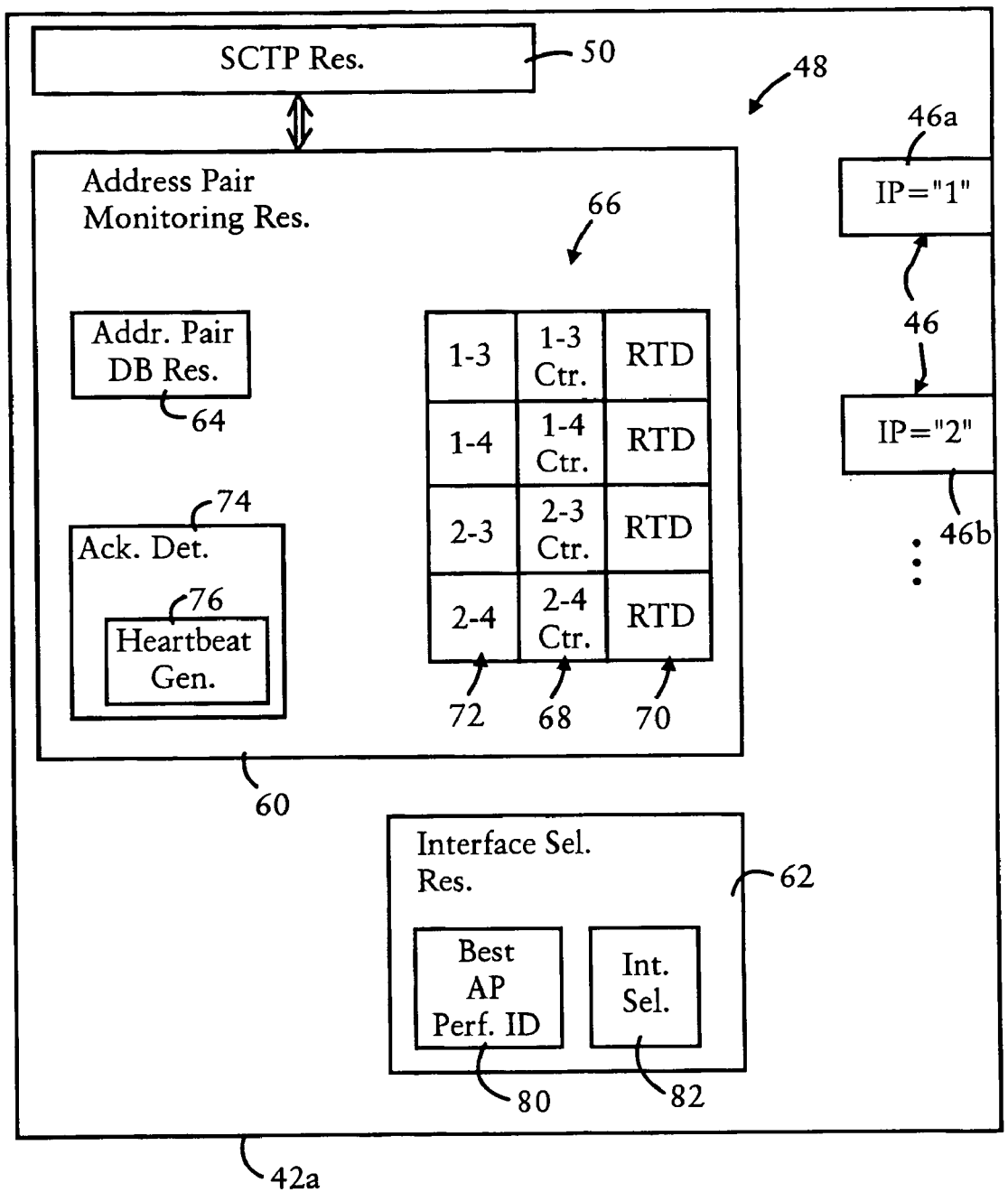
FIG. 3 is a diagram in detail one of the multi-homed endpoints, according to an embodiment of the present invention.

FIG. 3 is a diagram illustrating in further detail the multi-homed endpoint 42, according to an embodiment of the present invention. The endpoint 42 (e.g, endpoint 42a) includes a plurality of network interfaces (e.g., 46a, 46b, etc.) having respective IP addresses (e.g., "1", "2", etc.), a source address selection logic module 48, and an SCTP resource 50 configured for providing SCTP services according to RFC 2960.

The source address selection logic module 48 includes an address pair monitoring resource 60 and an interface selection resource 62. In particular, the address pair monitoring resource 60 is configured for identifying source-destination address pairs available between the IP source addresses assigned to the interfaces 46, and the IP destination addresses that are available for reaching the multi-homed peer 42b via the IP network 40. The address pair monitoring resource 60 also is configured for initiating, for each source-destination address pair, a metric for identifying successful data transfer between the corresponding IP source address (e.g., "1") of the transmitting endpoint 42a and the corresponding IP destination address (e.g., "3") of the peer endpoint 42b.

As illustrated in FIG. 3, the address pair monitoring resource 60 includes an address pair database resource 64 configured for monitoring the SCTP association startup in order to identify the available source IP addresses (e.g., "1" and "2") for the respective local network interfaces (e.g., 46a and 46b), and the available destination IP addresses (e.g., "3" and "4") that can be used for reaching the peer endpoint 42b via the IP network 40. In response to detecting the available source IP addresses and available destination IP addresses, the address pair database resource 64 generates a source-destination address pair table 66 that includes missed acknowledgment counters (i.e., failure counters) 68 and round-trip delay entries 70 for each corresponding source-destination address pair 72.

The address pair monitoring resource 60 also includes an acknowledgment detector 74 having a heartbeat generator resource 76. The acknowledgment detector 74 is configured for initiating, for each source-destination address pair 72, a metric stored in each corresponding counter 68 for identification of successful data transfer (or conversely, monitoring failed data transfers) between the corresponding IP source address and the corresponding IP destination address. If the acknowledgment detector 74 does not detect an acknowledgment, within a prescribed time interval, for a packet that has been transmitted via the corresponding source-destination address pair 72, the acknowledgment detector 74 increments the value stored in the corresponding counter 68; however if the acknowledgment detector 74 detects the expected acknowledgment for the packet having been transmitted via the corresponding source-destination address pair 72, and if the acknowledgment is received within the prescribed time interval, then the acknowledgment detector 74 decrements any nonzero value stored in the corresponding counter 68 (note that if the counter 68 already stores a zero value and the acknowledgment is received within the prescribed time interval, the stored counter value remains at zero).

Note that the acknowledgment detector 74 operates on a per-packet basis, including heartbeat data frames, enabling the acknowledgment detector 74 to determine whether respective acknowledgments are received for the heartbeat data frames. In particular, the heartbeat generator 76 is configured for outputting heartbeat data frames according to two scenarios: (1) during idle intervals where no SCTP user messages (as defined in RFC 2960) are sent, and (2) during data transmission where SCTP user messages (as defined in RFC 2960) are sent. In the first case of idle intervals where no SCTP user messages are output by the endpoint 42 for a prescribed interval (i.e., the idle interval), described below with respect to FIG. 5, the heartbeat generator 76 is configured for selecting a new source address (from an available plurality of source addresses) for sending a heartbeat data frame, according to a configurable time interval and according to a round robin sequence. Hence, the acknowledgment detector 74 is able to determine whether respective acknowledgements are received for the heartbeat data frames during idle intervals, enabling optimal selection of a source-destination address pair 72 when a user message is to be transmitted.

The heartbeat generator 76 also is configured for outputting heartbeat data frames in the second case where SCTP user messages are sent via a selected source-destination address pair 72. In particular, the heartbeat behavior specified in RFC 2960 permits a heartbeat frame to be sent, at a configurable interval, to each destination address that is that is not being used as the primary destination address. Note however, that RFC 2960 provides no description as to which source address is used. Hence, if a given message is sent using the "1-3" source-destination address pair 72, the heartbeat generator 76 will send a heartbeat frame, illustrated in step 106 of FIG. 4, to each of the other source-destination address pairs "1-4", "2-3", or "2-4" having a nonzero value in its corresponding counter 68. Hence, the acknowledgement detector 74 is able to update the counters 68 of the unselected source-destination address pairs while data packets (e.g., SCTP user messages) are transmitted on the source-destination address pair.

The acknowledgment detector 74 also is configured for determining the round-trip delay between transmission of a data frame and reception of the corresponding acknowledgment, and storing the determined round trip delay in the corresponding round-trip delay entry 70.

Hence, the acknowledgment detector 74 initiates and maintains the metrics 68 and 70 for identifying the performance of the respective source-destination address pairs 72: the counter 68 specifying the lowest count value indicates the corresponding source-destination address pair having the highest successful data transfer rate relative to the other source-destination pairs. The round-trip delay entry 70 specifies the corresponding round trip delay, either in terms of the most recently transmitted packet, or a moving average.

The interface selection resource 62 is configured for identifying one of the source-destination address pairs 72 having the corresponding metric (based on the counter value 68 and optionally the round trip delay 70) indicating the highest successful data transfer, and selecting that source address pair 72 for selection of the corresponding interface 46 based on the corresponding source IP address. In particular, the interface selection resource 62 includes a best address-pair (AP) performance identifier 80, and an interface selector 82. The best AP performance identifier 80 is configured for identifying the source-destination address pair having the corresponding metric indicating a highest successful data transfer relative to the other source-destination pairs. The interface selector 82 is configured for selecting the interface 46 (e.g., 46a or 46b) having the IP source address associated with the address pair identified by the AP performance identifier 80, for transport of the next message to the multi-homed peer 42b.

For example, if the AP performance identifier 80 identifies that the address pair "1-3" has a count value 68 of zero ("0") and the remaining address pairs "1-4", "2-3" and "2-4" have nonzero count values 68 (indicating transmit failures), the AP performance identifier 80 will identify the address pair "1-3" as having the highest successful data transfer relative to the other source-destination pairs. Consequently, the interface selector 82 will select the interface 46a having the source IP address "1" corresponding to the winning address pair "1-3" with the highest successful data transfer.

Figure 4:
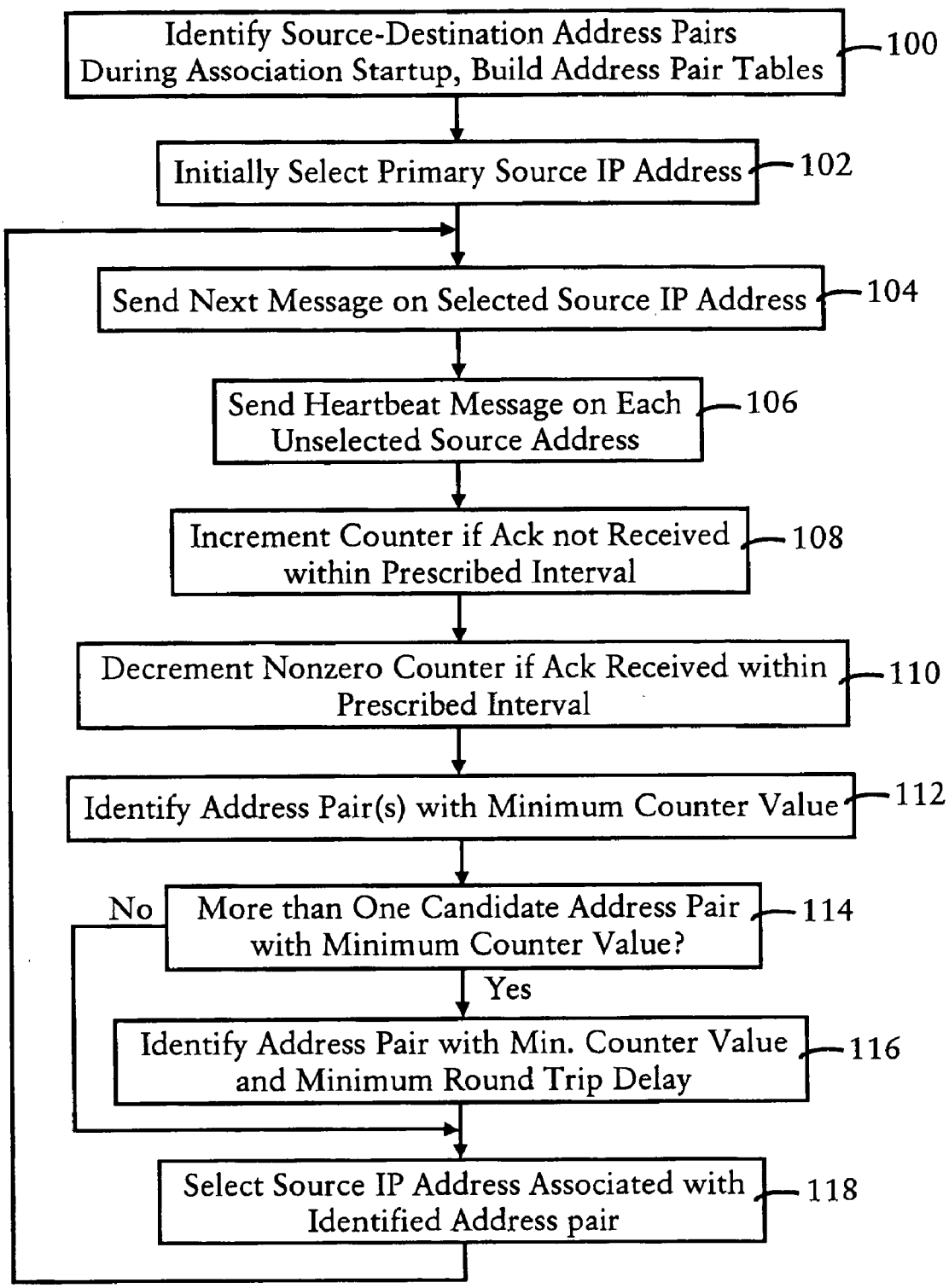
FIG. 4 is a diagram illustrating the method of selecting source addresses based on detected source-destination address pair metrics, according to an embodiment of the present invention.
Figure 5:
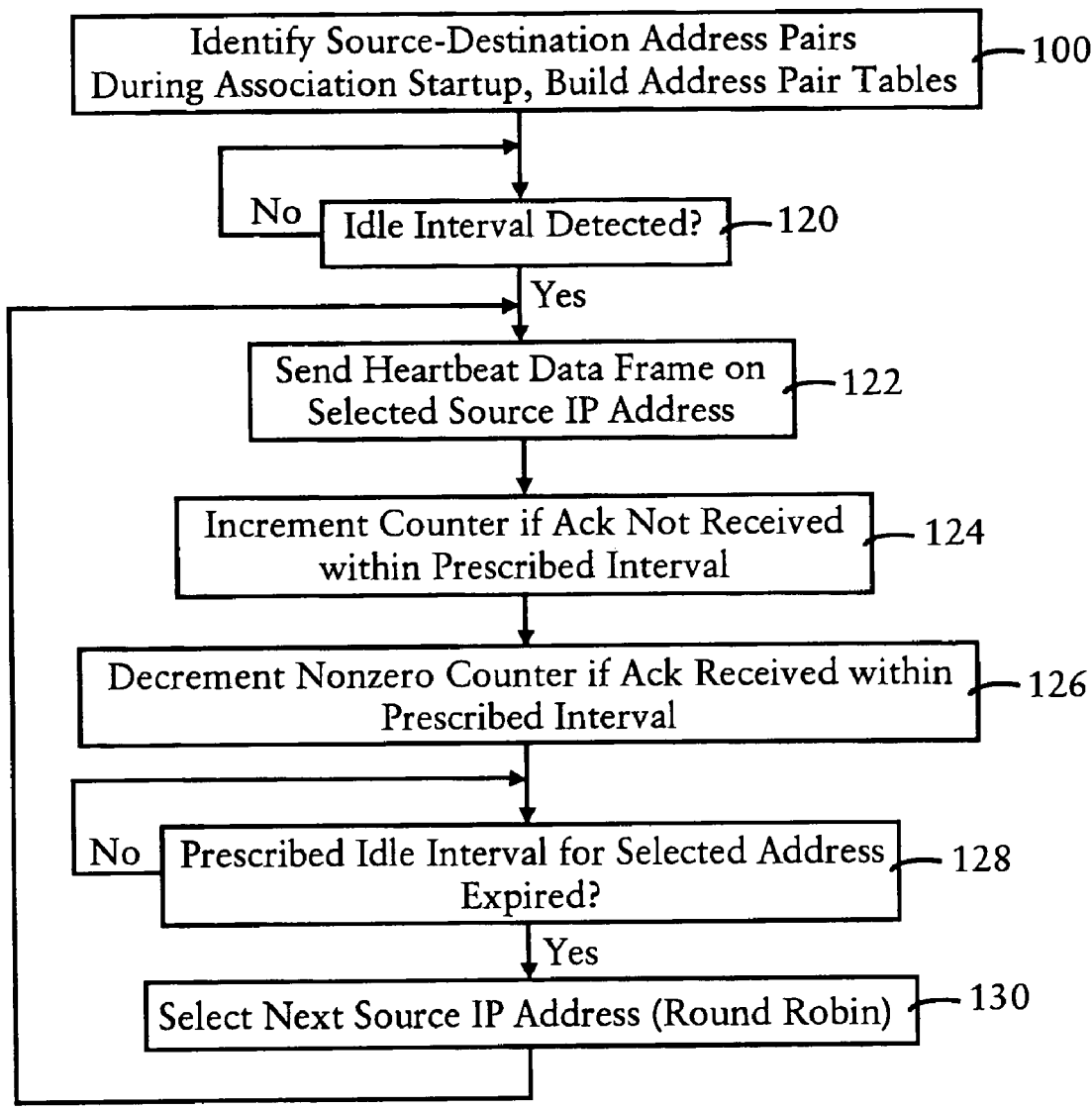
FIG. 5 is a diagram illustrating the method of initiating and determining the source-destination address pair metrics during idle intervals, according to an embodiment of the present invention.

FIG. 4 is a diagram illustrating the method of selecting a source IP address based on determined source-destination address pair metrics, according to an embodiment of the present invention. FIG. 5 is a diagram illustrating the method of initiating and determining the source-destination address pair metrics during idle intervals, according to an embodiment of the present invention. The steps described herein with respect to FIGS. 4 and 5 can be implemented as executable code stored on a computer readable medium (e.g., floppy disk, hard disk, EEPROM, CD-ROM, etc.).

The method begins in step 100, where the address pair database resource 64 identifies the source-destination address pairs 72 during negotiation between the endpoints 42a and 42b for identification of the respective IP addresses to be used for multi-homing (e.g., SCTP association startup). Upon identifying the IP addresses to be used by the local endpoint 42a and the remote endpoint 42b, the address pair database resource 64 builds in step 100 the table 66.

The interface selection resource 62 initially selects in step 102 one of the available source IP addresses (e.g., "1") as a primary source IP address for transmission of the first data packet or message (in the form of a "chunk" of multiple packets) in step 104 by the selected interface (e.g., 46a).

Following transmission of the initial data packet or message in step 104 using the primary source IP address (e.g., "1"), the interface selection resource 62 continues to use the primary source IP address for transmitting data packets, until the corresponding counter 68 is incremented due to a determined absence of an acknowledgement within the prescribed time interval, or another source IP address is identified as having a lower round trip delay 70. In particular, the selection resource 62 is configured such that after the initial data packet is sent in step 104 using the primary source IP address, the selection resource 62 will not select another source IP address for another packet while waiting for an acknowledgment from the first packet unless another source IP address has a better performance metrics than the primary source IP address: in this case, better performance metrics refers to another source IP address that has, for the same destination address, a lower counter value 68 or lower round trip delay 70).

Alternately, the selection resource 62 could be configured to select another source IP address (e.g, "2") in the event that another packet is to be transmitted before the prescribed time interval for receiving the acknowledgement for the first data packet has expired. In this case, assuming multiple interfaces, the selection resource 62 could be configured to employ a round-robin sequence of selecting the respective IP source addresses for transmission of successive data frames across the respective interfaces 46 while awaiting the respective acknowledgments. Hence, the selection resource 62 may initially employ a round-robin sequence in selecting source IP addresses until the counters 68 are populated with nonzero values, or the round trip delay entries 70 begin to demonstrate source-destination address pairs 72 having differing round trip delays.

The heartbeat generator 76 is configured for sending heartbeat messages in step 106 using the unselected source addresses, namely any source-destination address pair that was not utilized in step 104.

The acknowledgment detector 74 determines in step 108 if an acknowledgment is received within a prescribed time interval of sending a data frame in step 104 or a heartbeat data frame in step 106 via a corresponding source-destination address pair: if in step 108 an acknowledgment is not detected within a prescribed time interval of sending any data frame in steps 104 or 106 via its corresponding source-destination address pair (e.g., "1-3"), the acknowledgment detector 74 increments in step 108 the corresponding counter (e.g., "1-3 Ctr"). Similarly, if in step 110 the acknowledgment detector 74 detects an acknowledgment for any transmitted data frame within the corresponding prescribed time interval, the acknowledgment detector 74 decrements any nonzero value in the corresponding counter (e.g., "2-4") 68 associated with the source-destination address pair ("2-4") 72 of the transmitted data frame.

The best AP performance identifier 80 identifies in step 112 the address pairs having the minimum counter value 68: if in step 114 more than one candidate address pair has the minimum counter value, the identifier 80 identifies in step 116 the address pair 72 having both the minimum counter value and the minimum round trip delay as specified in the round trip delay entry 70.

Once the source-destination address pair 72 having the highest successful data transfer has been identified by the AP performance identifier 80 in steps 112, 114, and 116, the interface selector 82 selects in step 118 the source IP address associated with the identified address pair 72 for transmission of the next message in step 104.

FIG. 5 is a diagram illustrating in detail the initiating and monitoring of metrics for the source-destination address pairs 72, using the respective counters 68, during idle intervals. In particular, following the identification of source-destination address pairs in step 100, if in step 120 a prescribed idle interval is detected indicating an idle network state, for example during network startup where data traffic has not yet been established and the SCTP resource 50 has not yet begun transmitting SCTP user messages, the selection resource 62 initially selects a source IP address and the heartbeat generator outputs the heartbeat data frame in step 122 on the selected source IP address. The acknowledgement detector 74 increments in step 124 the corresponding counter 68 if the acknowledgement to the heartbeat data frame is not received within the prescribed interval. If the acknowledgement is received within the prescribed interval and the corresponding counter 68 has a nonzero value, the acknowledgement detector 74 decrements the corresponding counter in step 126 (if the counter 68 is already at zero, no action is taken).

The selection resource 62 waits in step 128 until the prescribed, configurable interval for testing the selected address during the idle network state has expired. Upon expiration of the prescribed idle interval for the selected address in step 128, the selection resource 62 selects in step 130 the next available source IP address according to a round robin sequence, and repeats the process of sending a heartbeat data frame. Note that at any time during the steps in FIG. 5 the selection resource may jump to step 112 in FIG. 4 in response to the SCTP resource 50 outputting a message (e.g., SCTP user message) for transmission.

Hence, maintaining counters 68 of unsuccessful transmissions for each address pair enables the acknowledgment detector 74 accumulates real-time information about the availability of data flows through the network 40 based on source-destination address pairs 72. Hence, monitoring performance using counters on a per packet basis enables the selection resource 62 to tend to utilize network flows that appeared more stable, and avoid network flows that or not as reliable. Further, the transmission of heartbeat data frames during detected idle network states enables the selection resource 62 to identify the source-destination address pair 72 having the highest successful data transfer (based on the counter values 68 and round trip delays 70) once data is supplied by the SCTP resource 50.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A multi-homed endpoint comprising:
a plurality of network interfaces having respective Internet Protocol (IP) source addresses, each network interface configured for establishing a connection with a multi-homed peer endpoint via an IP network for transmission of data from the multi-homed endpoint to the multi-homed peer endpoint via the IP network;
a first executable resource configured for identifying source-destination address pairs available between the IP source addresses and IP destination addresses available for reaching the multi-homed peer endpoint via the IP network, the first executable resource configured for initiating, for each source-destination address pair, a metric for identifying successful data transfer between the corresponding IP source address of the multi-homed endpoint and the corresponding IP destination address of the multi-homed peer endpoint; and
a selection resource configured for identifying one of the source-destination address pairs having the corresponding metric indicating a highest successful data transfer relative to the other source-destination pairs, the selection resource configured for selecting the network interface having the IP source address associated with the identified one source-destination address pair, for transmission of a message to the multi-homed peer endpoint;
wherein the first executable resource is configured for initiating a counter for each source-destination address pair, the first executable resource configured for:
incrementing the counter for a corresponding source-destination address pair in response to a determined absence of an acknowledgement within a prescribed time interval of sending a data frame via the corresponding source-destination address pair; and
decrementing the counter for a corresponding source-destination address pair, until reaching a zero value, in response to each acknowledgement detected within the corresponding prescribed time interval.

2. The multi-homed endpoint of claim 1, wherein the selection resource is configured for selecting the one source-destination address pair having the corresponding counter with a lowest counter value relative to the other counters.

3. The multi-homed endpoint of claim 2, wherein the selection resource is configured for selecting, between the one source-destination address pair and a second source-destination address pair each having the lowest counter value, the one source-destination pair based on having a lower corresponding determined round trip time interval.

4. The multi-homed endpoint of claim 2, wherein the first executable resource is configured for periodically sending heartbeat data frames on each of unselected ones of the source-destination address pairs, other than the identifed one source-destination address pair, having a corresponding non-zero value.

5. The multi-homed endpoint of claim 4, wherein the first executable resource is further configured for sending second heartbeat data frames, during a detected idle interval, on a selected one of the source-destination address pairs according to a round robin sequence.

6. The multi-homed endpoint of claim 2, wherein the selection resource is configured for selecting a new network interface, based on identifying the corresponding source-destination address pair having the corresponding metric indicating the highest successful data transfer relative to the other source-destination pairs, for each message to be output by the multi-homed endpoint to the multi-homed peer endpoint.

7. The multi-homed endpoint of claim 1, wherein the selection resource is configured for selecting a new network interface, based on identifying the corresponding source-destination address pair having the corresponding metric indicating the highest successful data transfer relative to the other source-destination pairs, for each message to be output by the multi-homed endpoint to the multi-homed peer endpoint.

8. A multi-homed endpoint comprising:
multiple network interfaces with respective Internet Protocol (IP) source addresses, each network interface configured for establishing a connection with a multi-homed peer endpoint via an IP network for transmission of data from the multi-homed endpoint to the multi-homed peer endpoint via the IP network;
first means for identifying source-destination address pairs available between the IP source addresses of the multi-homed endpoint and IP destination addresses available for reaching the multi-homed peer endpoint via the IP network;
means for initiating, for each source-destination address pair, a metric for identifying successful data transfer between the corresponding IP source address of the multi-homed endpoint and the corresponding IP destination address of the multi-homed peer endpoint; and
second means for identifying one of the source-destination address pairs having the corresponding metric indicating a highest successful data transfer relative to the other source-destination address pairs; and
means for selecting the network interface having the IP source address associated with the identified one source-destination address pair, for transmission of a message to the multi-homed peer endpoint via the selected network interface;
wherein the initiating means is configured, for each source-destination address pair, for:
incrementing a corresponding assigned counter in response to a determined absence of an acknowledgement within a prescribed time interval of sending a data frame via the corresponding source-destination address pair; and decrementing the corresponding assigned counter, until reaching a zero value, for each acknowledgement detected within the corresponding prescribed time interval.

9. The multi-homed endpoint of claim 8, wherein the second means for identifying is configured for identifying the one source-destination address pair having the corresponding assigned counter with a lowest counter value relative to the other assigned counters.

10. The multi-homed endpoint of claim 9, wherein the second means for identifying further is configured for selecting, between the one source-destination address pair and a second source-destination address pair each having the lowest counter value, the one source-destination pair based on having a lower corresponding determined round trip time interval.

11. The multi-homed endpoint of claim 9, wherein the initiating means is configured for periodically sending heartbeat data frames on each of unselected ones of the source-destination address pairs, other than the identifed one source-destination address pair, having a corresponding nonzero value.

12. The multi-homed endpoint of claim 11, wherein the initiating means is configured for sending second heartbeat data frames, during a detected idle interval, on a selected one of the source-destination address pairs according to a round robin sequence.

13. The multi-homed endpoint of claim 9, wherein the selecting means is configured for repeating the selection of a source IP address for each message to be output by the multi-homed endpoint to the multi-homed peer endpoint.

14. The multi-homed endpoint of claim 8, wherein the selecting means is configured for repeating the selection of a source IP address for each message to be output by the multi-homed endpoint to the multi-homed peer endpoint.

* * * * *